United States Patent [19]

Chin

[11] Patent Number: 5,002,654

[45] Date of Patent: Mar. 26, 1991

[54] REDUCING NO$_x$ EMISSIONS WITH ZINC CATALYST

[75] Inventor: Arthur A. Chin, Cherry Hill, N.J.

[73] Assignee: Mobil Oil Corporation, Fairfax, Va.

[21] Appl. No.: 458,000

[22] Filed: Dec. 28, 1989

[51] Int. Cl.$^5$ .............................................. C10G 11/18
[52] U.S. Cl. ..................................... 208/121; 208/113; 208/149; 423/239; 502/42
[58] Field of Search ................... 258/113, 120, 52, 149, 258/121, 124; 423/239; 502/42

[56] References Cited

U.S. PATENT DOCUMENTS

| | | | |
|---|---|---|---|
| 3,545,917 | 12/1970 | Stephens | 423/239 |
| 4,060,589 | 11/1977 | Hass et al. | 423/239 |
| 4,124,536 | 11/1978 | Itoh et al. | 502/245 |
| 4,235,704 | 11/1980 | Luckenbach | 208/113 |
| 4,434,147 | 2/1984 | Dimpfl et al. | 208/254 R |
| 4,521,389 | 6/1985 | Blanton, Jr. et al. | 208/120 |
| 4,778,665 | 10/1988 | Krishnamurthy | 208/120 |
| 4,789,531 | 12/1988 | Eichlotz et al. | 423/239 |
| 4,847,054 | 7/1989 | Weisweiler | 502/41 |
| 4,847,058 | 7/1989 | Odenbrand et al. | 423/239 |
| 4,855,116 | 8/1989 | Richter et al. | 208/120 |

Primary Examiner—Anthony McFarlane
Attorney, Agent, or Firm—Alexander J. McKillop; Charles J. Speciale; Richard D. Stone

[57] ABSTRACT

A process for regeneration of cracking catalyst while minimizing NO$_x$ emissions is disclosed. A zinc-based DeNO$_x$ catalyst is present in an amount and in a form which reduces NO$_x$ emissions. Relatively small amounts of zinc oxides impregnated on a separate support having little or no cracking activity are preferred. The zinc NO$_x$ reduction catalyst can be a separate particle additive, or can be made in situ by adding a solution or dispersion of zinc or a compound thereof to the cracking unit, or to the hydrocarbon feed to the cracking unit.

20 Claims, No Drawings

REDUCING NO$_x$ EMISSIONS WITH ZINC CATALYST

BACKGROUND OF THE INVENTION

1. FIELD OF THE INVENTION

The field of the invention is catalytic cracking of heavy hydrocarbon feeds in general, and reduction of NO$_x$ emissions from the regenerator associated with the cracking unit.

2. DESCRIPTION OF RELATED ART

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator. In the fluidized catalytic cracking (FCC) process, hydrocarbon feed contacts catalyst in a reactor at 425C-600C, usually 460C-560C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen-containing gas, usually air. Coke burns off, restoring catalyst activity and simultaneously heating the catalyst to, e.g., 500C-900C, usually 600C-750C. Flue gas formed by burning coke in the regenerator may be treated for removal of particulates and for conversion of carbon monoxide, after which the flue gas is normally discharged into the atmosphere.

Most FCC units now use zeolite-containing catalyst having high activity and selectivity. These catalysts work best when the amount of coke on the catalyst after regeneration is relatively low. It is desirable to regenerate zeolite catalysts to as low a residual carbon level as is possible. It is also desirable to burn CO completely within the catalyst regenerator system to conserve heat and to minimize air pollution. Heat conservation is especially important when the concentration of coke on the spent catalyst is relatively low as a result of high catalyst selectivity. Among the ways suggested to decrease the amount of carbon on regenerated catalyst and to burn CO in the regenerator is to add a CO combustion promoter metal to the catalyst or to the regenerator. Metals have been added as an integral component of the cracking catalyst and as a component of a discrete particulate additive, in which the active metal is associated with a support other than the catalyst. U.S. Pat. No. 2,647,860 proposed adding 0.1 to 1 weight percent chromic oxide to a cracking catalyst to promote combustion of CO. U.S. Pat. No. 3,808,121, incorporated herein by reference, introduced relatively large-sized particles containing CO combustion-promoting metal into a cracking catalyst regenerator. The circulating particulate solids inventory, of small-sized catalyst particles, cycled between the cracking reactor and the catalyst regenerator, while the combustion-promoting particles remain in the regenerator. Oxidation-promoting metals such as cobalt, copper, nickel, manganese, copper-chromite, etc., impregnated on an inorganic oxide such as alumina, are disclosed.

U.S. Pat. No. 4,072,600 and U.S. Pat. No. 4,093,535 teach use of combustion-promoting metals such as Pt, Pd, Ir, Rh, Os, Ru and Re in cracking catalysts in concentrations of 0.01 to 50 ppm, based on total catalyst inventory.

Many FCC units use CO combustion promoters. This reduces CO emissions, but usually increases nitrogen oxides (NO$_x$) in the regenerator flue gas. It is difficult in a catalyst regenerator to completely burn coke and CO in the regenerator without increasing the NO$_x$ content of the regenerator flue gas.

SOx emissions are also a problem in many FCC regenerators. SOx emissions can be greatly reduced by including a SOx capture additive in the catalyst inventory, and operating the unit at relatively high temperature, in a relatively oxidizing atmosphere. In such conditions, the SOx additive can adsorb or react with SOx in the oxidizing atmosphere of the regenerator, and release the sulfur as H2S in the reducing atmosphere of the cracking reactor. Platinum is known to be useful both for creating an oxidizing atmosphere in the regenerator via complete CO combustion and for promoting the oxidative adsorption of SO2. Hirschberg and Bertolacini reported on the catalytic effect of 2 and 100 ppm platinum in promoting removal of SO2 on alumina. Alumina promoted with platinum is more efficient at SO2 removal than pure alumina without any platinum. Unfortunately, those conditions which make for effective SOx removal (high temperatures, excess O2, Pt for CO combustion or for SOx adsorption) all tend to increase NO$_x$ emissions.

Many refiners have recognized the problem of NO$_x$ emissions from FCC regenerators, but the solutions proposed so far have not been completely satisfactory. Special catalysts have been suggested which hinder the formation of NO$_x$ in the FCC regenerator, or perhaps reduce the effectiveness of the CO combustion promoter used. Process changes have been suggested which reduce NO$_x$ emissions from the regenerator.

Recent catalyst patents include U.S. Pat. No. 4,300,997 and its division U.S. Pat. No. 4,350,615, both directed to the use of Pd-Ru CO combustion promoter. The bi-metallic CO combustion promoter is reported to do an adequate job of converting CO to CO2, while minimizing the formation of NO$_x$.

Another catalyst development is disclosed in U.S. Pat. No. 4,199,435 which suggests steam treating conventional metallic CO combustion promoter to decrease NO$_x$ formation without impairing too much of the CO combustion activity of the promoter.

U.S. Pat. No. 4,235,704 suggests too much CO combustion promoter causes NO$_x$ formation, and calls for monitoring the NO$_x$ content of the flue gases, and adjusting the concentration of CO combustion promoter in the regenerator based on the amount of NO$_x$ in the flue gas. As an alternative to adding less CO combustion promoter the patentee suggests deactivating it in place, by adding something to deactivate the Pt, such as lead, antimony, arsenic, tin or bismuth.

Process modifications are suggested in U.S. Pat. No. 4,413,573 and U.S. Pat. No. 4,325,833 directed to two- and three-stage FCC regenerators, which reduce NO$_x$ emissions.

U.S. Pat. No. 4,313,848 teaches countercurrent regeneration of spent FCC catalyst, without backmixing, to minimize NO$_x$ emissions.

U.S. Pat. No. 4,309,309 teaches the addition of a vaporizable fuel to the upper portion of a FCC regenerator to minimize NO$_x$ emissions. Oxides of nitrogen formed in the lower portion of the regenerator are reduced in the reducing atmosphere generated by burning fuel in the upper portion of the regenerator.

The approach taken in U.S. Pat. No. 4,542,114 is to minimize the volume of flue gas by using oxygen rather than air in the FCC regenerator, with consequent reduction in the amount of flue gas produced.

All the catalyst and process patents discussed above from U.S. Pat. No. 4,300,997 to U.S. Pat. No. 4,542,114, are incorporated herein by reference.

In addition to the above patents, there are myriad patents on treatment of flue gases containing $NO_x$. The flue gas might originate from FCC units, or other units. U.S. Pat. No. 4,521,389 and U.S. Pat. No. 4,434,147 disclose adding NH3 to $NO_x$ containing flue gas to catalytically reduce the $NO_x$ to nitrogen.

None of the approaches described above provides the perfect solution. Process approaches, such as multistage or countercurrent regenerators, reduce $NO_x$ emissions but require extensive rebuilding of the FCC regenerator.

Various catalytic approaches, e.g., use of bi-metallic CO combustion promoters, steamed combustion promoters, etc., to degrade the efficiency of the Pt function help some but still may fail to meet the ever more stringent $NO_x$ emissions limits set by local governing bodies.

I discovered a way to use a zinc-based catalyst to reduce $NO_x$ emissions in the flue gas from the regenerator.

BRIEF SUMMARY OF THE INVENTION

Accordingly, the present invention provides in a process for the catalytic cracking of a heavy hydrocarbon feed containing nitrogen compounds by contact with a circulating inventory of catalytic cracking catalyst to produce catalytically cracked products and spent catalyst containing coke comprising nitrogen compounds, and wherein said spent catalyst is regenerated by contact with oxygen or an oxygen-containing gas in a catalyst regeneration zone operating at catalyst regeneration conditions to produce hot regenerated catalyst which is recycled to catalytically crack the heavy feed and said catalyst regeneration zone produces a flue gas comprising CO2 and oxides of nitrogen, $NO_x$, the improvement comprising reducing the $NO_x$ content of the flue gas by adding to the circulating catalyst inventory an $NO_x$ reduction catalyst comprising zinc in an amount sufficient to reduce the production of $NO_x$ relative to operation without said $NO_x$ reduction catalyst.

In another embodiment, the present invention provides in a process for the catalytic cracking of a heavy hydrocarbon feed containing more than 500 ppm N by contact with a circulating inventory of catalytic cracking catalyst wherein said feed is cracked by contact with a source of hot regenerated cracking catalyst to produce catalytically cracked products and spent catalyst containing coke comprising nitrogen compounds, and wherein said spent catalyst is regenerated by contact with oxygen or an oxygen-containing gas in a catalyst regeneration zone operating at catalyst regeneration conditions including the presence of excess oxygen or oxygen-containing gas to produce hot regenerated catalyst which is recycled to catalytically crack the heavy feed and said catalyst regeneration zone produces a flue gas comprising CO2 and oxides of nitrogen, $NO_x$ the improvement comprising adding to the circulating catalyst inventory a $NO_x$ reduction catalyst comprising zinc, said $NO_x$ reduction catalyst being added in an amount sufficient to reduce the production of $NO_x$ relative to operation without said $NO_x$ reduction catalyst.

In a more limited embodiment, the present invention provides a process for the catalytic cracking of a heavy hydrocarbon feed comprising more than 1000 wt ppm nitrogen by contacting the heavy feed with a circulating inventory of cracking catalyst comprising a zeolite-containing cracking catalyst which catalyst inventory comprises 0.1 to 10 wt ppm Pt or other CO combustion promoting metal having an equivalent combustion activity said process comprising: cracking the heavy feed with said circulating inventory of catalytic cracking catalyst which contains from 0.5 to 5 wt % zinc in the form of zinc oxide or zinc alloy or zinc mineral, in a catalytic cracking reaction zone means to produce cracked products and spent catalyst containing nitrogenous coke; separating and recovering from spent catalyst catalytically cracked products as a product of the process and a spent catalyst stream containing strippable cracked products; stripping the spent catalyst to remove strippable cracked products therefrom and produce stripped catalyst; regenerating the stripped catalyst by contact with an excess supply of oxygen or an oxygen-containing gas in a regeneration means to produce regenerated catalyst which is recycled to the catalytic cracking zone means to crack fresh feed and a flue gas containing CO, CO2, O2, $NO_x$, and wherein at least 90% of the CO is converted to CO2, and at least 25% of the $NO_x$ is catalytically converted in the regeneration zone means to nitrogen by said zinc $NO_x$ reduction catalyst.

DETAILED DESCRIPTION

The present invention is an improvement for use in any catalytic cracking unit which regenerates cracking catalyst. The invention will be most useful in conjunction with the conventional all riser cracking FCC units, such as disclosed in U.S. Pat. No. 4,421,636, which is incorporated herein by reference.

Although the present invention is applicable to both moving bed and fluidized bed catalytic cracking units, the discussion that follows is directed to FCC units which are considered the state of the art.

FCC FEED

Any conventional FCC feed can be used. The process of the present invention is useful for processing nitrogenous charge stocks, those containing more than 500 ppm total nitrogen compounds, and especially useful in processing stocks containing very high levels of nitrogen compounds, such as those with more than 1000 wt ppm total nitrogen compounds. There are many high nitrogen, low sulfur and low metal feeds which cause $NO_x$ emission problems even though sulfur emissions are not a problem, and metals passivation is not necessary.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids. The present invention is most useful with feeds having an initial boiling point above about 650° F.

Hydrotreated feeds, with high residual nitrogen contents, are ideal for use in the process of the present invention. Hydrotreating efficiently removes sulfur and metals from heavy hydrocarbon feeds, but does not remove nitrogen compounds as efficiently. For these hydrotreated gas oils, vacuum gas oils, etc., there is a need for a cost effective method of dealing with $NO_x$ emissions which would allow the units to be pushed to the maximum extent possible. The hydrotreated feeds are readily crackable, and high conversions and gasoline yields can be achieved. However, if $NO_x$ emissions from the regenerator are excessively high, flexibility and severity of FCC operations can be greatly limited.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5-40 wt % of the catalyst, with the rest being matrix. Conventional zeolites such as X or Y zeolites, or aluminum deficient forms of these zeolites such as dealuminized Y (DEAL Y), ultrastable Y (USY) and ultrahydrophobic Y (UHP Y) zeolites may be used. The zeolites may be stabilized with Rare Earths, e.g., 0.1 to 10 wt % RE.

The catalyst inventory may also contain one or more additives, either present as separate additive particles, or mixed in with each particle of the cracking catalyst. Additives can be added to enhance octane (medium pore size zeolites, sometimes referred to as shape selective zeolites, i.e., those having a Constraint Index of 1-12, and typified by ZSM-5, and other materials having a similar crystal structure).

CO combustion additives are available from most FCC catalyst vendors.

The FCC catalyst composition, per se, forms no part of the present invention.

SOx ADDITIVES

Additives may be used to adsorb SOx. These are believed to be primarily various forms of alumina, containing minor amounts of Pt, on the order of 0.1 to 2 ppm Pt.

Good additives for removal of SOx are available from several catalyst suppliers, such as Davison's "R" or Katalistiks International, Inc.'s "DESOX."

The cerium and/or lanthanum on alumina additive of U.S. Pat. No. 4,589,978, Green et al, may be used to reduce SOx emissions.

The process of the present invention works well with these additives, in that the effectiveness of the SOx additive is not impaired by adding my DeNOx additive. My DeNOx additive also works well at the conditions essential for proper functioning of the SOx additive, namely relatively high temperatures, excess oxygen in regenerator flue gas, and the presence of Pt promoter.

FCC REACTOR CONDITIONS

Conventional riser cracking conditions may be used. Typical riser cracking reaction conditions include catalyst/oil ratios of 0.5:1 to 15:1 and preferably 3:1 to 8:1, and a catalyst contact time of 0.1-50 seconds, and preferably 0.5 to 5 seconds, and most preferably about 0.75 to 4 seconds, and riser top temperatures of 900° to about 1050° F.

It is important to have good mixing of feed with catalyst in the base of the riser reactor, using conventional techniques such as adding large amounts of atomizing steam, use of multiple nozzles, use of atomizing nozzles and similar technology.

It is preferred, but not essential, to have a riser catalyst acceleration zone in the base of the riser.

It is preferred, but not essential, to have the riser reactor discharge into a closed cyclone system for rapid and efficient separation of cracked products from spent catalyst. A preferred closed cyclone system is disclosed in U.S. Pat. No. 4,502,947 to Haddad et al, which is incorporated by reference.

It is preferred but not essential, to rapidly strip the catalyst just as it exits the riser, and upstream of the conventional catalyst stripper. Stripper cyclones disclosed in U.S. Pat. No. 4,173,527, Schatz and Heffley, which is incorporated herein by reference, may be used.

It is preferred, but not essential, to use a hot catalyst stripper. Hot strippers heat spent catalyst by adding some hot, regenerated catalyst to spent catalyst. Suitable hot stripper designs are shown in U.S. Pat. No. 3,821,103, Owen et al, which is incorporated herein by reference. If hot stripping is used, a catalyst cooler may be used to cool the heated catalyst before it is sent to the catalyst regenerator. A preferred hot stripper and catalyst cooler is shown in U.S. Pat. No. 4,820,404, Owen, which is incorporated by reference.

The FCC reactor and stripper conditions, per se, can be conventional.

CATALYST REGENERATION

The process and apparatus of the present invention can use conventional FCC regenerators.

Preferably a high efficiency regenerator is used. The essential elements of a high efficiency regenerator include a coke combustor, a dilute phase transport riser and a second dense bed. Preferably, a riser mixer is used. These regenerators are widely known and used.

The process and apparatus can also use conventional, single dense bed regenerators, or other designs, such as multi-stage regenerators, etc. The regenerator, per se, forms no part of the present invention.

CO COMBUSTION PROMOTER

Use of a CO combustion promoter in the regenerator or combustion zone is not essential for the practice of the present invention, however, it is preferred. These materials are well-known.

U.S. Pat. No. 4,072,600 and U.S. Pat. No. 4,235,754, which are incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit.

ZINC CATALYST

My process uses a zinc-based catalyst. The zinc-based catalyst can be used in any form, so long as it will reduce $NO_x$ emissions from an FCC regenerator. The zinc-based catalyst should be used in a form in which it is stable in the FCC unit, and in a form which causes no undesirable catalytic effect in the FCC unit. It is also possible to dispose the zinc catalyst on a support, or in a form, where it is effectively isolated from the FCC cracking reaction section, and then the zinc catalyst need only be stable to conditions experienced in the regenerator.

Zinc metal, although inexpensive, is not a preferred form for the zinc catalyst. This is because the zinc metal has a relatively low melting point (419.6° C.) which could cause it to plate out on various cool spots in the FCC unit. Zinc metal also has a significant vapor pressure (it has a boiling point of 911° C.) which could cause significant amounts of zinc metal to be lost with regenerator flue gas or with cracked products.

Zinc may nonetheless still be used in elemental metal form, provided it is used in the form of a high melting alloy with some other metal such that the zinc alloy or zinc mineral is stable at the conditions experienced in the FCC regenerator. Suitable alloys include zinc-copper, zinc-iron, zinc-titanium and similar alloys.

Zinc stabilization techniques, such as those discussed in U.S. Pat. No. 4,848,568 (McCullen), which is incorporated herein by reference, can also be used to prevent volatilization of zinc, such as by treatment of the zinc with non-metal oxides or sulfides.

Zinc compounds which have a relatively high melting point, and are chemically stable and non reactive, are preferred for use herein. The following have not all been tested for chemical activity for DeNOx, but are believed to be useful for DeNOx based on their melting points. These compounds include zinc aluminum oxide, zinc arsenide (mp 1015C), zinc iron oxide (1/1) (mp 1590C), zinc oxide (mp 1970C), zinc phosphate (mp 900C), zinc zirconate ($ZnZrO_3$), and zinc titanate ($ZnTiO_3$). Other zinc compounds which may be useful include zinc borate (mp 900C), zinc silicates, zinc selenide (mp greater than 1970C), zinc sulfide and zinc telluride.

Zinc-containing minerals can also be used. These include:
zinc blend or sphalerite (ZnS)
marmatite (ZnFe)S
Calamine or smithsonite ($ZnCO_3$)
Hemimorphite ($4ZnO \cdot 2SiO_2 \cdot 2H_2O$)
Hydrozincite ($5ZnO \cdot 2CO_2 \cdot 3H_2O$)
zincite (ZnO)
Willemite ($2ZnO \cdot SiO_2$)

Zinc oxide and zinc phosphate are preferred, with zinc oxide especially preferred.

The zinc compounds may be disposed on a porous support, or may be used neat. The zinc compounds may be sprayed or impregnated onto a portion of the FCC catalyst inventory, or disposed on separate particles of clay, silica, silica/alumina, alumina etc.

The zinc catalyst may be formed in situ by adding a dispersion or solution of zinc or a zinc compound to the FCC unit. A dispersion of zinc oxide in water or other carrier could be sprayed into the FCC regenerator. A dispersion or solution of a zinc compound in oil could be added to the feed to the FCC unit. The zinc compound will deposit rapidly on the catalyst, and form a zinc-based DeNOx catalyst in situ.

I prefer to add the zinc catalyst in the form of zinc oxide on an inert matrix. The additive would be made by impregnating a suitable Zn salt on the matrix and calcining. The matrix, or support, provides physical strength for the additive. Using a separate zinc additive, rather than incorporating the zinc additive into the FCC catalyst, should reduce adverse effects on FCC yields.

The amount of zinc, on an elemental metal basis, that should be added can range from 0.0001 to 10.0 % of the circulating catalyst inventory, and preferably from 0.01 to 10.0 wt % of the circulating catalyst inventory, and most preferably from 0.05 to 1.0% zinc.

EXAMPLES

A series of tests were conducted to determine the effectiveness of my additive. The tests were conducted in a small, laboratory micro-unit operating with 10 g of spent equilibrium FCC catalyst taken from a commercial FCC unit. Chemical and physical properties are reported in Table 1.

TABLE 1

| SPENT CATALYST PROPERTIES | |
|---|---|
| Surface Area, $m^2/g$ | 133 |
| Bulk Density, g/cc | 0.80 |
| $Al_2O_3$, wt % | 43.2 |
| Carbon, wt % | 0.782 |
| Nickel, ppm | 1870 |
| Vanadium, ppm | 1000 |
| Sodium, ppm | 3000 |
| Copper, ppm | 28 |
| Iron, ppm | 5700 |
| Platinum, ppm | 1.4 |
| Nitrogen, ppm | 160 |

EXAMPLE 1 (Prior Art)

Example 1 is a base case or prior art case operating without any additive. A 10 g sample of this catalyst was placed in a laboratory fixed fluidized bed regenerator and regenerated at 1300° F. by passing 200 cc/min of a regeneration gas comprising 10% and 90% N2. $NO_x$ emissions in the resulting flue gas were determined via chemiluminescence, using an Antek 703C $NO_x$ detection system.

EXAMPLE 2 (Invention)

Example 1 was repeated, but this time with 0.5 g of chemical grade zinc oxide (ZnO) powder added to the 10 g sample of spent catalyst. The DeNOx activity was determined by comparing the integrated $NO_x$ signal to the base case without additive. The integrated $NO_x$ signal roughly corresponds to the average performance that would be expected in a commercial FCC unit, operating at steady state conditions. The integrated $NO_x$ was reduced 41%.

EXAMPLE 3 (Invention)

Example 1 was repeated with 0.5 g of zinc phosphate (Zn3(PO4)2). The integrated $NO_x$ was reduced 25%.

EXAMPLE 4 (Invention)

Example 1 was repeated with 0.5 g of $ZnZrO_3$. The integrated $NO_x$ was reduced 2%. This may not be significant, as it is probably within the limits of experimental error of the test.

EXAMPLE 5 (Invention)

Example 1 was repeated with 0.5 g of $ZnTiO_3$. The integrated $NO_x$ was reduced 7%.

EXAMPLE 6,7 (Comparison)

Several other additives were tested in a similar fashion, and the experimental results are reported in Table 2.

TABLE 2

| EXAMPLE | ADDITIVE | % REDUCTION IN $NO_x$ |
|---|---|---|
| 1 (base) | none | base |
| 2 | ZnO | 41% |
| 3 | Zn3(PO4)2 | 25% |
| 4 | ZnZrO3 | 2% |
| 5 | ZnTiO3 | 7% |
| 6 | TiO2 | 1% |

TABLE 2-continued

| EXAMPLE | ADDITIVE | % REDUCTION IN NO$_x$ |
|---|---|---|
| 7 | ZrO2 | (3%) |

These experimental results show that zinc is an effective additive for catalytically reducing the amount of NO$_x$ contained in FCC regenerator flue gas.

If practicing the invention now, I would add sufficient zinc additive to achieve NO$_x$ reduction to the FCC catalyst, either as part of the FCC catalyst, or as a separate particle additive. Other forms of zinc, such as compounds or alloys of zinc may be used, either neat or dispersed on a support.

The amount of Zn present in the additive can vary from 0.5 to 80 wt %, on an elemental metal basis, but preferably the additive contains 1 to 20 wt % Zn, and most preferably 2 to 15 wt % Zn.

The Zn additive may comprise from 0.1 to 20 wt % of the equilibrium catalyst, and preferably comprises 0.2 to 10 wt %, and most preferably 0.5 to 5 wt % of the catalyst inventory.

The amount of Zn additive present may also be adjusted based on the amount of nitrogen in the feed, with 0.05 to 50 weights of Zn being present on catalyst per weight of feed nitrogen, and preferably 0.1 to 20 and most preferably 0.5 to 10 weights of Zn on catalyst per weight of feed nitrogen.

The process of the present invention will work well in regenerators operating at 1000° to 1650° F., preferably at 1150° to 1500° F., and most preferably at 1200° to 1400° F. NO$_x$ emissions will be reduced over a large range of excess air conditions, ranging from 0.1 to 5% O2 in flue gas. Preferably the flue gas contains 0.2 to 4% O2, and most preferably 0.5 to 3% O2.

The process of the present invention permits feeds containing more than 500 ppm nitrogen compounds to be processed easily, and even feeds containing 1000 or 1500 ppm N or more can now be cracked with reduced NO$_x$ emissions.

I claim:

1. In a process for the catalytic cracking of a heavy hydrocarbon feed containing nitrogen compounds by contact with a circulating inventory of catalytic cracking catalyst to produce catalytically cracked products and spent catalyst containing coke comprising nitrogen compounds, and wherein said spent catalyst is regenerated by contact with oxygen or an oxygen-containing gas in a catalyst regeneration zone operating at catalyst regeneration conditions to produce hot regenerated catalyst which is recycled to catalytically crack the heavy feed and said catalyst regeneration zone produces a flue gas comprising CO2 and oxides of nitrogen, NO$_x$, the improvement comprising reducing the NO$_x$ content of the flue gas by adding to the circulating catalyst inventory an NO$_x$ reduction catalyst comprising zinc in an amount sufficient to reduce the production of NO$_x$ relative to operation without said NO$_x$ reduction catalyst.

2. The process of claim 1 wherein said NO$_x$ reduction catalyst comprises oxides of zinc present as discrete particles which contain 0.5 to 80.0 wt % zinc on an elemental metal basis.

3. The process of claim 1 wherein said NO$_x$ reduction catalyst comprises 0.2 to 10 wt % of the circulating catalyst inventory and the particles contain 1 to 20 wt % zinc on an elemental metal basis.

4. The process of claim 1 wherein the zinc is added in the form of oxides of zinc deposited on a support, and wherein the cracking catalyst has a cracking activity and the zinc additive has at least an order of magnitude less cracking activity than the cracking catalyst.

5. The process of claim 1 wherein the zinc NO$_x$ reduction catalyst is added to the unit in the form of a solution or dispersion, and the zinc NO$_x$ reduction catalyst is formed in situ by deposition of zinc on the cracking catalyst.

6. The process of claim 1 wherein NO$_x$ emissions in the flue gas are reduced by at least 25%.

7. The process of claim 1 wherein the zinc additive is a zinc alloy or zinc mineral.

8. The process of claim 1 wherein the zinc additive is zinc oxide on a porous support.

9. The process of claim 1 wherein the zinc additive is dissolved or dispersed in the hydrocarbon feed to the cracking unit.

10. In a process for the catalytic cracking of a heavy hydrocarbon feed containing more than 500 ppm N by contact with a circulating inventory of catalytic cracking catalyst wherein said feed is cracked by contact with a source of hot regenerated cracking catalyst to produce catalytically cracked products and spent catalyst containing coke comprising nitrogen compounds, and wherein said spent catalyst is regenerated by contact with oxygen or an oxygen-containing gas in a catalyst regeneration zone operating at catalyst regeneration conditions including the presence of excess oxygen or oxygen-containing gas to produce hot regenerated catalyst which is recycled to catalytically crack the heavy feed and said catalyst regeneration zone produces a flue gas comprising CO2 and oxides of nitrogen, NO$_x$, the improvement comprising adding to the circulating catalyst inventory a NO$_x$ reduction catalyst comprising zinc, said NO$_x$ reduction catalyst being added in an amount sufficient to reduce the production of NO$_x$ relative to operation without said NO$_x$ reduction catalyst.

11. The process of claim 10 wherein the NO$_x$ reduction catalyst comprises oxides of zinc present as discrete particles which contain 0.5 to 80.0 wt % zinc on an elemental metal basis.

12. The process of claim 10 wherein the zinc NO$_x$ reduction catalyst is oxides of zinc on separate particles, the NO$_x$ reduction catalyst particles comprise 0.2 to 10 wt % of the circulating catalyst inventory and the particles contain 1 to 20 wt % zinc on an elemental metal basis.

13. The process of claim 10 wherein the zinc NO$_x$ reduction catalyst is added in the form of oxides of zinc deposited on a support, and wherein the cracking catalyst has a cracking activity and the zinc NO$_x$ reduction catalyst has at least an order of magnitude less cracking activity than the cracking catalyst.

14. The process of claim 10 wherein the zinc is incorporated into or supported on the cracking catalyst particles.

15. The process of claim 10 wherein NO$_x$ emissions in the flue gas are reduced by at least 33%.

16. The process of claim 10 wherein the heavy feed contains more than 500 wt ppm nitrogen and wherein 0.2 to 10 wt % NO$_x$ reduction catalyst comprising 1 to 20 wt % zinc, on an elemental metal basis, is added to the catalyst inventory in the form of separate particles and wherein NO$_x$ emissions are reduced at least 25% relative to operation at the same regenerator conditions without zinc addition.

17. The process of claim 16 wherein the heavy feed contains more than 1000 wt ppm nitrogen.

18. The process of claim 10 wherein the zinc $NO_x$ reduction catalyst is zinc oxide on a support of silica, alumina or mixtures thereof.

19. The process of claim 10 wherein the regenerator flue gas contains at least 1 mole % oxygen.

20. A process for the catalytic cracking of a heavy hydrocarbon feed comprising more than 1000 wt ppm nitrogen by contacting the heavy feed with a circulating inventory of cracking catalyst comprising a zeolite-containing cracking catalyst which catalyst inventory comprises 0.1 to 10 wt ppm Pt or other CO combustion promoting metal having an equivalent combustion activity as that of platinum said process comprising:

cracking the heavy feed with said circulating inventory of catalytic cracking catalyst which contains from 0.5 to 5 wt % zinc in the form of zinc oxide or zinc alloy or zinc mineral, in a catalytic cracking reaction zone means to produce cracked products and spent catalyst containing nitrogenous coke;

separating and recovering from spent catalyst catalytically cracked products as a product of the process and a spent catalyst stream containing strippable cracked products;

stripping the spent catalyst to remove strippable cracked products therefrom and produce stripped catalyst;

regenerating the stripped catalyst by contact with an excess supply of oxygen or an oxygen-containing gas in a regeneration means to produce regenerated catalyst which is recycled to the catalytic cracking zone means to crack fresh feed and a flue gas containing CO, CO2, O2, $NO_x$, and wherein at least 90% of the CO is converted to CO2, and at least 25% of the $NO_x$ is catalytically converted in the regeneration zone means to nitrogen by said zinc $NO_x$ reduction catalyst.

* * * * *